3,412,170
PRODUCTION OF ISOPRENE
Claiborne A. Duval, Jr., Howard S. Bryant, Jr., and David H. F. Liu, Beaumont, Tex., assignors to Mobil Oil Corporation, a corporation of New York
No Drawing. Filed Dec. 23, 1964, Ser. No. 420,798
9 Claims. (Cl. 260—680)

ABSTRACT OF THE DISCLOSURE

A process for producing isoprene which includes the steps of reacting ethylene and a methyl acetylene-propadiene mixture at a temperature from about 350° to 550° F. and at superatmospheric pressures in the presence of a heterogenous solid catalyst, e.g. phosphoric acid on silica, or preferably, a crystalline alumino-silicate containing transitional metal and/or heavy metal cations within an ordered internal structure and recovering a product containing isoprene.

---

This invention relates to the production of isoprene and in particular to a process for producing isoprene and its precursors in the presence of a solid catalyst.

Heretofore, production of isoprene by various synthesis and refinery processes has involved use of costly starting materials or complex reaction schemes. Consequently, use of these processes necesssitates both high production costs and substantial capital investment. For example, in a refinery-type process, such as the propylene dimerization pyrolysis process, the following steps are ofter required to produce isoprene: (1) use of a Zeigler-type catalyst for synthesis of 2-methyl-1-pentene, (2) the isomerization of 2-methyl-1-pentene to 2-methyl-2-pentene, and (3) the subsequent demethanation of the 2-pentene to isoprene by thermal pyrolysis. Advantageously, the process of this invention uses readily available starting materials in an essentially one step process to produce isoprene and its precursors, without many of the problems of the prior art.

This invention contemplates production of isoprene by effecting reaction of ethylene and methyl acetylene-propadiene in the presence of a solid heterogenous catalyst. More particularly, this invention is directed to a process for producing isoprene and its precursors by reacting ethylene and methyl acetylene-propadiene in a gaseous phase in the presence of crystalline metal aluminosilicate catalysts or less preferably, in the presence of acid type solid catalysts e.g., phosphoric acid on silica.

The expression "methyl acetylene-propadiene" as used herein has reference to a mixture consisting of methyl acetylene and propadiene, the latter diene being a labile compound often produced in association with methyl acetylene which shows a marked tendency to rearrange to the more stable acetylene compound.

Advantageously, this mixture of unsaturated compounds is often produced as a by-product of many chemical reactions. Thus, a methyl acetylene-propadiene concentrate could be made available in a conventional ethylene plant by propylene fractionation. This fractionation could also constitutes purification of propylene to polymer grade purity or could precede a selective hydrogenation unit as commonly used for the production of polymer grade propylene.

In accordance with this invention, the production of isoprene can be illustrated by the following equations:

(I) 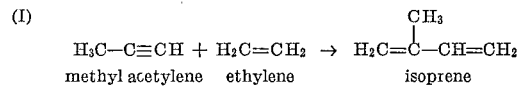

(II) 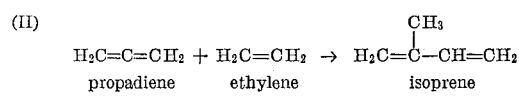

It will be appreciated that in addition to isoprene, other products may also be formed during the above reactions. Advantageously, several of these products are precursor compounds which can be readily converted to isoprene by conventional techniques, such as, dehydrogenation and the like. Exemplary of the precursor compounds produced by the present process are 3-methyl-1-butene, 2-methyl-1-butene, 2-methyl-2-butene, and the like. Other useful products include propane, isobutane, n-butane, butene-1, trans-butene-2, cis-butene-2, isopentene, pentene-1, trans-pentene-2, cis-pentene-2, hexene-1, and the like.

It will be appreciated that separation and purification of isoprene and its precursors can be accomplished by using conventional distillation techniques.

Various amounts of the reactants can be used for the purpose of the present invention. In general, the amount of ethylene in a feed mixture of ethylene and methyl acetylene-propadiene may vary from about 25 percent by volume to about 75 percent by volume. Often stoichiometric proportions, i.e., a 50:50 molal mixture of ethylene and methylacetylene-propadiene are employed.

The temperature at which the reaction between ethylene and methyl acetylene-propadiene is conducted can vary from about 350° to 550° F.; preferably the temperature should be between about 400° and about 500° F.

Production of isoprene, in accordance with this invention, is conducted at superatmospheric pressures. Usually, the reactions of this invention are effected at pressure of about 150 p.s.i.g. or higher; a pressure form about 150 p.s.i.g. to about 300 p.s.i.g. is particularly effective The amount of catalyst used will vary, and depend, in part, on whether the process used as a batch type operation, a continuous operation, or semi-continuous operation and on the nature of the catalyst. Generally, with a batch type operation, the amount of aluminosilicate catalyst will vary from about 450 to 900 grams per gram of the feed charged to the reactor. Acid type catalysts such as the acid treated clays and the like usually are used in greater amounts than the aluminosilicate catalysts, i.e., from about 900 to about 1800 grams per gram of the feed charged to the reactor. In such operations, in a fixed bed reactor, the retention time for the feed mixture may vary from about 10 to about 30 minutes.

In continuous or semi-continuous operations, in which one or more reactor vessels are employed, the amount of alumino silicate catalyst used, measured in terms of the space velocity of the feed stream, can range from about 10 to about 60 and preferably from about 23 to about 46. With acid catalysts, space velocities of from 12 to 23 are usually employed. As used herein "space velocity" is defined as the gas volume of feed, measured at atmospheric pressure and 32° F., per hour per unit volume of reactor.

It will be understood that the crystalline aluminosilicate catalysts contemplated by this invention can be regenerated by burning off their contaminates at temperatures of about 1000° F. in an oxygen containing atmosphere.

It will be appreciated that the presence of the small amounts of paraffins and inert gases, such as nitrogen in the feed apparently have no effect on the production of isoprene. On the other hand, it has been found that water and other polar compounds, i.e., $H_2S$, and HCl, should be eliminated from the reactants before being contacted with the catalysts.

It will also be appreciated that the process of this invention can be conducted in a fixed bed or fluidized bed operation as an adiabatic or isothermal process, depending on the nature of the catalyst employed, as well as other operating conditions.

In accordance with the present invention, several different types of crystalline aluminosilicates, which can either naturally occurring or synthetic products, can be employed as catalysts. Particularly effective catalysts are the aluminosilicates that contain transitional metal and/or heavy metal cations within an ordered internal structure. These metals are ionically bonded or chemisorbed with the molecular structure of the aluminosilicate. Such bonding or chemisorption can be effected by base exchange of an alkali metal or alkaline earth metal form of a synthetic or naturally occurring aluminosilicate with a fluid medium containing cations of the transition metals and/or the heavy metals, i.e., titanium, vanadium, chromium, rare earth metals, manganese, iron, cobalt, nickel, copper, zinc, mercury, gold, and the like; nickel, mercury, and silver being the most preferred ions.

In general, the alkali metal or alkaline earth metal aluminosilicate salts are base exchanged so as to partially or completely replace the alkali metal or alkaline earth cations with the desired metal cations. After being base exchanged, the resulting products are washed with water to remove the anions of the base exchange solution, dried, and activated by being calcined to form a dehydrated crystalline product having a system of internal pores, passages or cavities within an ordered internal structure.

A wide variety of metallic compounds can be employed as a source of metallic cations and include both inorganic and organic salts of the transition and heavy metals of Group I through Group VIII of the periodic table.

Representative of the salts which can be employed, include chlorides, bromides, iodides, carbonates, bicarbonates, sulfates, sulfides, thiocyanates, dithiocarbamates, peroxysulfates, acetates, benzoates, citrates, fluorides, nitrates, nitrites, formates, propionates, butyrates, valerates, lactates, malonates, oxalates, palmitates, hydroxides, tarates, and the like. The only limitations on the particular metal salt or salts employed are that it be soluble in the fluid medium in which it is used. The preferred salts are the chlorides, nitrates, acetates, and sulfates.

Advantageously, the rare earth cations can be provided from the salt of a single metal or preferable mixture of metals such as a rare earth chloride or didymium chlorides. Such mixtures are usually introduced as a rare earth chloride solution which, as used herein, has reference to a mixture of rare earth chlorides consisting essentially of the chlorides of lanthanum, cerium, praseodymium, and neodymium, with minor amounts of samarium, gadolinium, and yttrium. This solution is commercially available and contains the chlorides of a rare earth mixture having the relative composition cerium (as $CeO_2$) 48% by weight, lanthanum (as $La_2O_3$) 24% by weight, praseodymium (as $Pr_6O_{11}$) 5% by weight, neodymium as $Nd_2O_3$) 17% by weight, samarium (as $Sm_2O_3$) 3% by weight, gadolinium (as $Gd_2O_3$) 2% by weight, yttrium (as $Y_2O_3$) 0.2% by weight, and other rare earth oxides 0.8% by weight. Didymium chloride is also a mixture of rare earth chlorides, but having a low cerium content. It consists of the following rare earths determined as oxides: lanthanum, 45–46% by weight; cerium, 1–2% by weight; praseodymium, 9–10% by weight; neodymium, 32–33% by weight; samarium, 5–6% by weight; gadolinium, 3–4% by weight; yttrium, 0.4% by weight; other rare earths 1–2% by weight. It is to be understood that other mixtures of rare earths are equally applicable in the instant invention.

Representative metal salts which can be employed, aside from the mixtures mentioned above, include silver chloride, silver sulfate, silver nitrate, silver acetate, silver arsinate, silver bromide, silver citrate, silver carbonate, silver oxide, silver tartrate, copper acetate, copper arsentate, copper benzoate, copper bromide, copper carbonate, copper chloride, copper citrate, beryllium bromide, berryllium carbonate, berryllium sulfate, zinc sulfate, zinc nitrate, zinc acetate, zinc chloride, zinc bromide, titanium bromide, titanium chloride, titanium nitrate, titanium sulfate, zirconium chloride, zirconium nitrate, zirconium sulfate, chromic acetate, chromic chloride, chromic nitrate, chromic sulfate, ferric chloride, ferric bromide, ferric acetate, ferrous chloride, ferous asentate, ferrous lactate, ferrous sulfate, nickel chloride, nickel bromide, cerous acetate, cerous bromide, cerous carbonate, cerous chloride, cerous iodide, cerous sulfate, cerous sulfide, lanthanum chloride, lanthanum bromide, lanthanum nitrate, lanthanum sulfate, lanthanum sulfide, yttrium bromate, yttrium bromide, yttrium chloride, yttrium nitrate, yttrium sulfate, samarium sulfate, neodymium chloride, neodymium oxide, neodymium sulfide, neodymium sulfate, praseodymium chloride, praseodymium bromide, praseodymium sulfate, praseodymium sulfide, etc.

In addition, aluminosilicates containing hydrogen ions within their ordered internal structure may also serve as catalytic materials for this invention. The aluminosilicate catalysts containing hydrogen ions can also be prepared from either naturally occurring or synthetic aluminosilicates. Generally, aluminosilicates having exchangeable metal cations (e.g., alkali metals and alkaline earth metals) that can be completely or partially replaced by conventional base exchange with hydrogen ions are used to produce a relatively high concentration or hydrogen sites, i.e., positions at which hydrogen ions are bonded to the aluminosilicate.

Some aluminosilicates can be base exchanged directly with hydrogen ions to form a catalyst suitable for this invention. However, other aluminosilicates, such as, zeolite X, a synthetic faujasite, are not suitable for direct base exchange with hydrogen ions, or are not structurally or thermally stable after a portion of their exchangeable metal cations have been replaced with hydrogen ions. Thus, it is often necessary to exchange other metal cations with these aluminosilicates to achieve the necessary stability within the ordered internal structure prior to the inclusion of the hydrogen ions. Advantageously, it has been found that base exchange of certain polyvalent metal cations, particularly those of the rare earth metals, provides stability to the aluminosilicate so that it can be base exchanged with hydrogen ions or cations convertible to the hydrogen ions, e.g., the ammonium ion.

It will be appreciated that the unique activity of the aluminosilicate catalysts for effecting the reactions of the present invention is also dependent, in part, upon the accessibility of the metal cations and/or hydrogen ions contained therein. Thus, the defined pore size should be of such dimensions that it can accept the reactants of an intended process within its ordered internal structure and allow egress of the desired product. Consequently, the pore size is at least about 4 A. in diameter and preferably from about 6 A. to about 15 A. in diameter.

Typical of the aluminosilicates employed in accordance with this invention, are several aluminosilicates, both natural and synthetic, which have a defined pore size of from about 4 A. to about 15 A. within an ordered internal structure. These aluminosilicates can be described as a three dimensional framework of $SiO_4$ and $AlO_4$ tetrahedra in which the tetrahedra are cross-linked by the sharing of oxygen atoms whereby the ratio of the total aluminum and silicon atoms to oxygen atoms is 1:2. In their hydrated form, the aluminosilicates may be represented by the formula:

$$M_{2/n}O:Al_2O_3:wSiO_2:yH_2O$$

wherein M is a cation which balances the electrovalence of the tetrahedra, $n$ represents the valence of the cation, $w$ the moles of $SiO_2$, and $y$ the moles of $H_2O$. The cation can be any one or more of a number of metal ions depending on whether the aluminosilicate is synthesized or occurs naturally. Typical cations include sodium, lithium, potassium, calcium, and the like. Although the proportions of inorganic oxides in the silicates and their spatial arrangement may vary, effecting distinct properties in the aluminosilicates, the two main characteristics of these materials are the presence in their molecular structure of at least .5 equivalents of an ion of positive valence per gram atom of aluminum, and an ability to undergo dehydration without substantially affecting the $SiO_4$ and $AlO_4$ framework.

One of the crystalline aluminosilicates utilized by the present invention is the synthetic faujasite designated as zeolite X, and is represented in terms of mole ratios of oxides as follows:

$$1.0 \pm 0.2 M_{2/n}O:Al_2O_3:2.5 \pm 0.5 SiO_2:yH_2O$$

wherein M is a cation having a valence of not more than 3, $n$ represents the valence of M, and $y$ is a value up to 8, depending on the identity of M and the degree of hydration of the crystal. The sodium form may be represented in terms of mole ratios of oxides as follows:

$$0.9\ Na_2O:Al_2O_3:2.5\ SiO_2:6.1\ H_2O$$

Zeolite X is commercially available in both the sodium and the calcium forms.

It will be appreciated that the crystalline structure of zeolite X is different from most zeolites in that it can absorb molecules with molecular diameters up to about 10 A.; such molecules including branched chain hydrocarbons, cyclic hydrocarbons, and some alkylated cyclic hydrocarbons.

Other aluminosilicates are contemplated as also being effective catalytic materials for the invention. Of these other aluminosilicates, a synthetic faujasite, having the same crystalline structure as zeolite X and designated as zeolite Y has been found to be active. Zeolite Y differs from zeolite X in that it contains more silica and less alumina. Consequently, due to its higher silica content this zeolite has more stability to the hydrogen ion than zeolite X.

Zeolite Y is represented in terms of mole ratios of oxides as follows:

$$0.9 \pm 0.2\ Na_2O:Al_2O_3:WSiO_2:XH_2O$$

wherein W is a value greater than 3 up to about 5 and X may be a value up to about 9.

The selectivity of zeolite Y for larger molecules is appreciably the same as zeolite X because its pore size extends from 10 A. to 13 A.

Another synthesized crystalline aluminosilicate, designated as zeolite A, has been found to be effective for the purposes of this invention. This zeolite may be represented in mole ratios of oxides as:

$$1.0 \pm 0.2 M_{2/n}O:Al_2O_3:1.85 \pm 0.5\ SiO_2:yH_2O$$

wherein M represents a metal, $n$ is the valence of M and $y$ is any value up to about 6.

The sodium form of this zeolite may be represented by the following formula:

$$Na_{12}(AlO_2)_{12}(SiO_2)_{12} \cdot 27H_2O$$

This material often designated as a "4A" zeolite, has a pore sibe of about 4 A. in diameter. When the sodium cations have been substantially replaced with calcium by conventional exchange techniques, the resulting zeolite is designated as a "5A" zeolite and has a defined pore size of about 5 A. in diameter.

Other aluminosilicate materials which may be suitable for the present process include as mordenite and mordenite-like structures. These zeolites have an ordered crystalline structure having a ratio of silicon atoms to aluminum atoms of about 5 to 1. In its natural state mordenite usually occurs as a mixed salt of sodium, calcium and/or potassium. The pure sodium form may be represented by the following formula:

$$Na_8(AlO_2)_8(SiO_2)_{40} \cdot 24H_2O$$

Mordenite has an ordered crystalline structure made up of chains of 5-membered rings of tetrahedra. In its sodium form the crystal is believed to have a system of parallel channels having free diameters of about 4.0 A. to about 4.5 A., interconnected by smaller channels, parallel to another axis, on the order of 2.8 A. free diameters. Advantageously, in certain ionic forms, e.g. acid exchanged, the mordenite crystal can have channels with effective free diameters of from about 6.5 A. to about 8.1 A. As a result of this crystalline framework, mordenite in proper ionic forms, sorbs benzene and other cyclic hydrocarbons.

It will be appreciated that other aluminosilicates can be employed as catalysts for the processes of this invention. A criterion for each catalyst is that its ordered internal structure must have defined pore sizes of sufficient diameters to allow entry of the preselected reactants and the formation of the desired reaction products. Furthermore, the aluminosilicate advantageously should have ordered internal structure capable of chemisorbing or ionically bonding additional metals and/or hydrogen ions within its pore structure so that its catalytic activity may be altered for a particular reaction. Among the naturally occurring crystalline aluminosilicates which can be employed are faujasite, heulandite, clinoptilolite, chabazite, gmelinite, mordenite and mordenite-like structures, and dachiardite.

Particularly effective aluminosilicate catalysts for this invention are those prepared from the class of zeolites having faujasite-like crystalline structures. These catalysts characterized by having a defined pore size of at least about 6 A. in diameter, are prepared from the sodium form of zeolite X by a conventional base exchange involving partial replacement of the sodium by contact with a fluid medium containing cations of nickel, mercury, or silver. Any medium which will effect ionization without affecting the crystalline structure of the faujasite material may be employed. After such treatment, the resulting exchanged product is water-washed, dried, and dehydrated. The dehydration removes water which fills the pores of the aluminosilicate, thereby producing the characteristic system of open pores, passages, or cavities of crystalline aluminosilicates.

As a result of the above treatment, the metal exchanged aluminosilicate is an activated crystalline catalyst material in which the molecular structure has been changed by having nickel, mercury or silver cations chemisorbed or ionically bonded thereto.

It will be appreciated that zeolite X may be also base exchanged with a fluid medium containing rare earth cations followed by exchange with a solution containing hydrogen ions. The resulting rare earth-hydrogen exchanged zeolite X is an effective acid catalyst material.

Other effective faujasite-type catalysts suitable for this invention may be prepared from zeolite Y. Zeolite Y may be activated by the same base exchange techniques employed for the metal exchanged zeolite X catalysts. It has been found that the exchange of nickel, silver, mercury or the rare earth metals for the sodium cations within zeolite Y produces an active catalyst. Also, because zeolite Y has a high acid stability resulting from its high silicon to aluminum ratio, acid catalyst may be produced from this faujasite by partially replacing the sodium cations directly with hydrogen ions. This replacement may be accomplished by treatment with a fluid medium containing hydrogen ions and/or ions capable of conversion to hydrogen cations. Inorganic and organic acids represent the sources of hydrogen cations, whereas ammonium solutions such as the chlorides and sulfates, are representative of the fluid media containing cations capable of conversion to hydrogen ions. Accordingly, it will be appreciated that the fluid medium may contain hydrogen, amonium ions, or a mixture thereof, with a pH range from about 1 to about 12.

Mordenite may be activated to serve as a catalyst for the instant invention by replacement of its sodium ions with hydrogen ions. The necessary base exchange is essentially the same as that described above for the preparation of acid zeolite Y, except that mineral acids such as HC1, are employed as a source of hydrogen ions. In general, the mordenite material is reduced to a fine powder (approximately passing a 200 mesh sieve and preferably passing 300 to 325 mesh sieves or finer) and then is acid treated, washed of anions, dried and dehydrated to form the crystaline alumino-silicate structure.

The other less preferred acid type solid catalysts that can be used for the process of this invention include acid treated clays, e.g., fuller's earths, vermiculites, attapulgites, kaolinites, ittietes, montmorillonites, bentonites, kieselguhr, and the like; heterpolyacid gels, e.g., silica-magnesia, silica-titania, and the like, phosphoric acid on silica, kieselguhr, and the like.

The aluminosilicate catalyst may be employed directly as a catalyst or it may be combined with a suitable support or binder. The particular chemical composition of the latter is not critical. It is, however, necessary that the support or binder employed be thermally stable under the conditions at which the conversion reaction is carried out. Thus, it is contemplated that solid porous adsorbents, carriers and supports of the type heretofore employed in catalytic operations may feasibly be used in combination with the crystalline aluminosilicate. Such materials may be catalytically inert or may posses an intrinsic catalytic activity or an activity attributable to close association or reaction with the crystalline aluminosilicate. Such materials include by way of examples, dried inorganic oxide gels and gelatinous precipitates of alumina, silica, zirconia, magnesia, thoria, titania, boria and combinations of these oxides with one another and with other components. Other suitable supports include activated charcoal, mullite, kieselguhr, bauxite, silicon carbide, sintered alumina and various clays. These supported crystalline aluminosilicates may be prepared by growing crystals of the aluminosilicate in the pores of the support. Also, the aluminosilicate may be intimately composed with a suitable binder, such as inorganic oxide hydrogel or clay, for example by ball milling the two materials together over an extended period of time, preferably in the presence of water, under conditions to reduce the particle size of the aluminosilicate to a weight mean particle diameter of less than 40 microns and preferably less than 15 microns. Also, the aluminosilicate may be combined with and distributed throughout a gel matrix by dispersing the aluminosilicate in powdered form in an inorganic oxide hydrosol. In accordance with the procedure, the finely divided aluminosilicate may be dispersed in an already prepared hydrosol or, as is preferable, where the hydrosol is characterized by a short time of gelation, the finely divided aluminosilicate may be added to one or more of the reactants used in forming the hydrosol or may be admixed in the form of a separate stream with streams of the hydrosol-forming reactants in a mixing nozzle or other means where the reactants are brought into intimate contact. The powder-containing inorganic oxide hydrosol sets to a hydrogel after lapse of a suitable period of time and the resulting hydrogel may thereafter, if desired, be exchanged to introduce selected ions into the aluminosilicate and then dried and calcined.

The inorganic oxide gel employed, as described above as a matrix for the metal aluminosilicate, may be a gel of any hydrous inorganic oxide, such as, for example, aluminous or siliceous gels. While alumina gel or silica gel may be utilized as a suitable matrix, it is preferred that the inorganic oxide gel employed be a cogel of silica and an oxide of at least one metal selected from the group consisting of metals of Groups IIA, IIIB, and IVA of the Periodic Table. Such components include for example, silica-alumina, silica-magnesia, silica-zirconia, silica-thoria, silica-beryllia, silica-titania as well as ternary combinations such as silica-alumina-thoria, silica-alumina-zirconia, silica-alumina-magnesia and silica-magnesia-zirconia. In the foregoing gels, silica is generally present as the major component and the other oxides of metals are present in minor proportion. Thus, the silica content of such gels is generally within the approximate range of about 55 to about 100 weight percent with the metal oxide content ranging from zero to 45 weight percent. The inorganic oxide hydrogels utilized herein and hydrogels obtained therefrom may be prepared by any method well-known in the art, such as for example, hydrolysis of ethyl orthosilicate, acidification of an alkali metal silicate and a salt of a metal, the oxide of which it is desired to cogel with silica, etc. The relative proportions of finely divided crystalline aluminosilicate and inorganic oxide gel matrix may vary widely with the crystalline alumino-silicate content ranging from about 2 to about 90 percent by weight and more usually, particularly where the composite is prepared in the form of beads, in the range of about 5 to about 50 percent by weight of the composite.

The catalyst of aluminosilicate employed in the process of this invention may be used in the form of small fragments of a size best suited for operation under the specific conditions existing. Thus, the catalyst may be in the form of a finely divided powder or may be in the form of pellets of about $\frac{1}{16}''$ to about $\frac{1}{8}''$ in diameter, obtained upon pelleting the aluminosilicate with a suitable binder such as clay. The zeolite X, described hereinabove, may be obtained on a clay-free basis or in the form of pellets in which clay is present as a binder.

In the examples that follow, which are illustrative of the scope of the invention, the reactions were carried out in a micro-reactor containing a fixed bed of aluminosilicate catalyst and equipped with a thermowell for obtaining the temperature of the bed.

In order to regulate the heat imput to the catalyst, a resistance wire was wrapped around the reactor and connected to a variable transformer.

The runs were conducted in either batch-type or continuous operation and the products of each run were analyzed by vapor phase chromatography or infrared techniques.

Example I

Three batch-type operations were conducted in which 0.078 grams of a 50:50 molal mixture of ethylene and methyl acetylene-propadiene (the methyl acetylene-propadiene mixture contained 30.8 wt. percent of propadiene and 69.2 wt. percent of methyl acetylene) was charged into a micro-reactor containing 3.5 cc. of a silver exchanged zeolite X catalyst, a faujasite catalyst, at a pressure of 150 p.s.i.g. In the first operation, the catalyst was heated to 400° F., in the second, 450° F., and in the third, 500° F.

At intervals of 15 and 30 minutes, samples were taken from the reactor during each batch operation and analized by gas chromatography. This analysis showed quantitative conversions (12.8%) to isoprene and its precursors and also the presence of products of ethylene dimerization.

Example II

Following the procedure described in Example I, additional reactions, between a 50:50 molal mixture of ethylene and methylacetylene-propadiene, (having substantially the same proportions of propadiene and methyl acetylene as described in Example I) were conducted at temperatures from about 400° to 500° F. and at pressures from about 10 to 300 p.s.i.g., using different metal exchanged aluminosilicate and acid type catalysts. In addition, one run was conducted continuously using a nickel exchanged zeolite X catalyst. Production of isoprene is shown by the following table of date:

TABLE 1

| Catalyst Used | Temp., °F. | Press, p.s.i.g. | Contact, mins. | Results |
|---|---|---|---|---|
| Hg-X Zeolite | 400<br>500 | 175<br>175<br>215<br>300 | 5, 10, 15<br>30 | Isoprene formed at 500° F. Evidence of dimerization of ethylene. |
| Ni-X Zeolite | 400<br>400<br>500 | 175<br>10<br>170 | 5, 15, 30<br>30<br>2.3 | Isoprene formed at 400° F. Dimerization products of $C_2H_4$ present. |
| Phosphoric Acid on Silica | 400<br>450<br>400 | 175<br>175<br>100 | 2, 5, 10, 15<br>15<br>2, 5, 10 | Relatively small conv. to isoprene. |
| Rare Earth-X Zeolite | 375<br>400<br>425 | 180 | 10 | Relatively small to isoprene. |
| Cobalt-X Zeolite | 375<br>400<br>425 | 180 | 10 | Do. |

Example III

Additional reactions of the ethylene and methyl acetylene-propadiene were effected continuously in a microreactor over solid heterogenous catalysts in which a 50:50 molal mixture of ethylene and methylacetylene-propadiene, as described in Example I, was employed.

TABLE 2

| Catalyst Used | Temp., °F. | Press, p.s.i.g. | Time, min. | Conv. Percent to Isoprene |
|---|---|---|---|---|
| Ni-X-Zeolite | 400 | 150 | 30 | 1 |
| Cu-X-Zeolite | 400 | 175 | 15 | 1 |

It will be appreciated from the above examples that the production of isoprene can be effected over a variety of heterogenous solid catalysts by the process of this invention.

It will also be appreciated that the examples set forth above, as well as the foregoing specification, are merely illustrative of the different catalysts that may be used for the present process and that other crystalline aluminosilicates and solid acid catalysts may be employed to produce isoprene from reaction of ethylene and methylacetylene-propadiene.

It will further be appreciated that various modifications and alterations may be made in the process without departing from the spirit of the invention.

What is claimed is:

1. A process for producing isoprene which comprises effecting reaction of ethylene and a methyl acetylene-propadiene mixture in the vapor phase at a temperature from about 300° F. to about 550° F. at superatmospheric pressures in the presence of a catalyst comprising a crystalline aluminosilicate base exchanged to contain metal cations selected from the group consisting of titanium, vanadium, chromium, the rare earth metals, manganese, iron, cobalt, nickel, copper, zinc, mercury, gold, and silver within an ordered internal structure, said ordered internal structure having a defined pore size of from about 4 A. to about 15 A. in diameter, and thereafter recovering a product containing isoprene.

2. The process of claim 1 in which the reaction is effected at temperatures of from about 400° to about 500° F.

3. The process of claim 1 in which the reaction is effected under a pressure of from about 150 p.s.i.g. to about 300 p.s.i.g.

4. The process of claim 1 in which the molar ratio between ethylene and the methyl acetylene-propadiene mixture extends from about 1:3 to about 3:1.

5. The process of claim 1 in which the catalyst is a nickel exchanged faujasite.

6. The process of claim 1 in which the catalyst is a mercury exchanged faujasite.

7. The process of claim 1 in which the catalyst is a silver exchanged faujasite.

8. The process of claim 1 in which the crystalline aluminosilicate is supported on a matrix binder support.

9. A process for producing isoprene which comprises effecting reaction of ethylene and a methyl acetylene-propadiene mixture in the vapor phase at a temperature from about 350° to 550° F. and at superatmospheric pressures in the presence of a catalyst consisting essentially of phosphoric acid on silica.

References Cited

UNITED STATES PATENTS

| | | | |
|---|---|---|---|
| 1,436,819 | 11/1922 | Plauson | 260—680 |
| 2,569,092 | 9/1951 | Deering | 260—683.15 X |
| 2,594,706 | 4/1952 | Allan | 260—678 |
| 2,925,451 | 2/1960 | Hogsed | 260—678 |
| 3,052,740 | 9/1962 | Day | 260—680 |
| 3,082,273 | 3/1963 | Peer et al. | 260—678 |
| 3,178,365 | 4/1965 | Miale | 260—683.15 X |
| 3,236,762 | 2/1966 | Rabo et al. | 260—683.15 X |
| 3,243,470 | 3/1966 | Davis | 260—678 X |

PAUL M. COUGHLAN, Jr., *Primary Examiner.*